Figure 1:
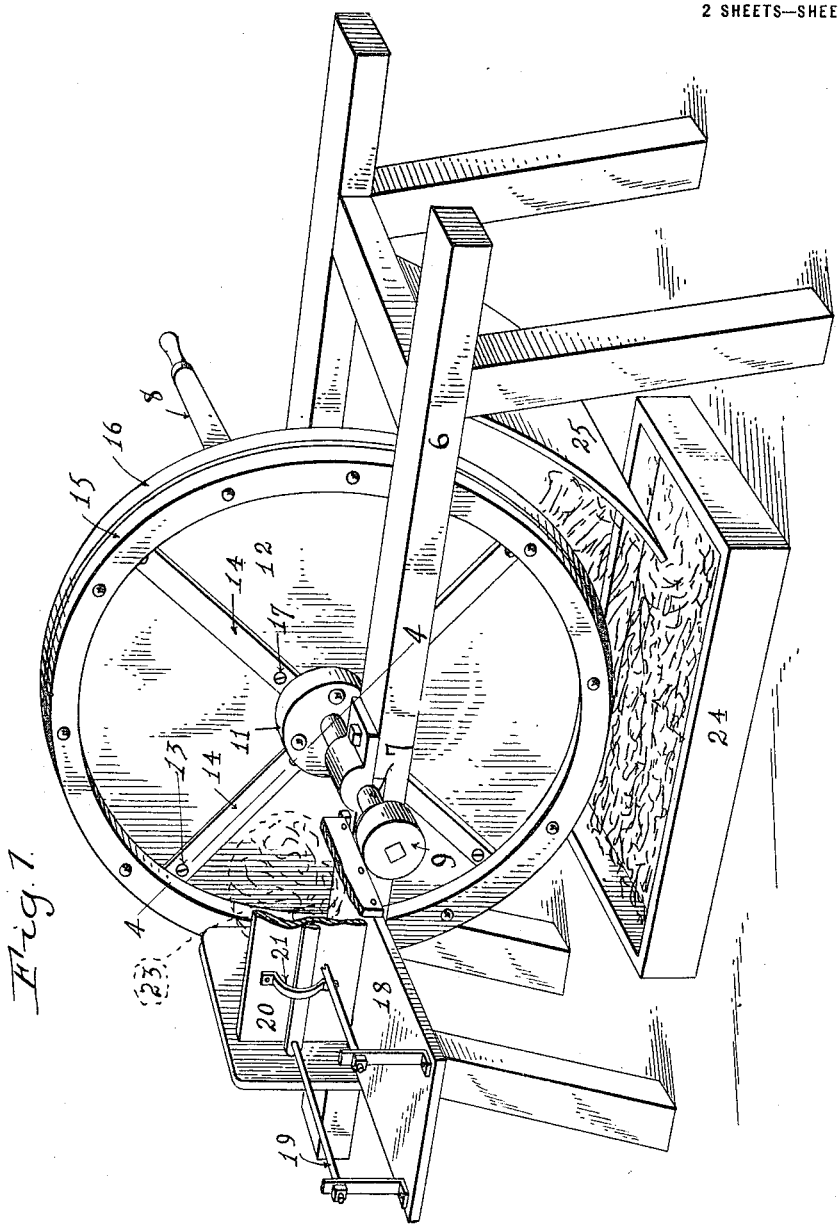

J. RUDNICKI.
VEGETABLE CUTTER.
APPLICATION FILED MAY 23, 1914.

1,150,969.

Patented Aug. 24, 1915.
2 SHEETS—SHEET 1.

Witnesses:—
Richard Sommer
D. K. Harper

Inventor
Joseph Rudnicki
by A. J. Sangster
Attorney

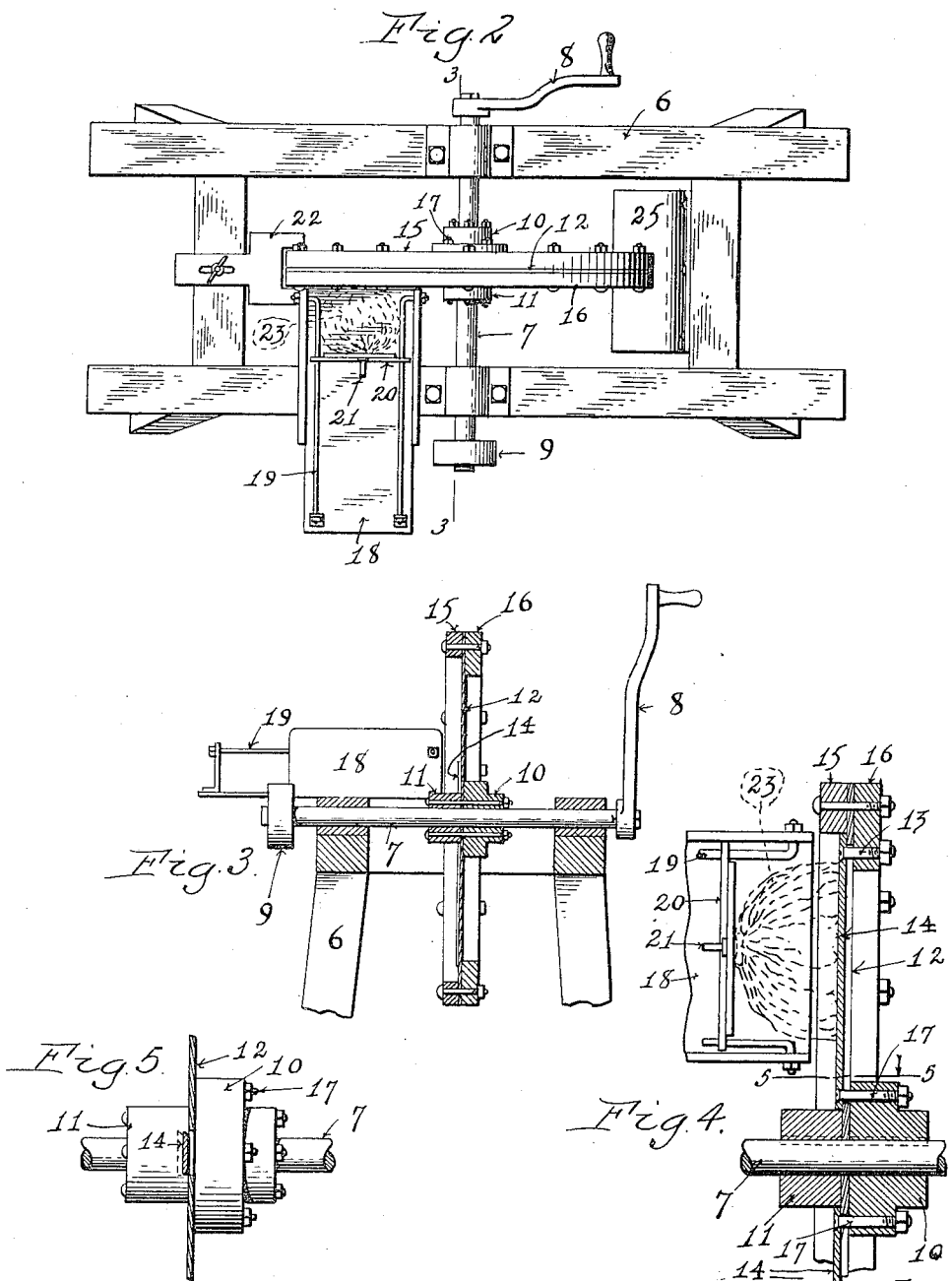

UNITED STATES PATENT OFFICE.

JOSEPH RUDNICKI, OF BUFFALO, NEW YORK.

VEGETABLE-CUTTER.

1,150,969.  Specification of Letters Patent.  Patented Aug. 24, 1915.

Application filed May 23, 1914. Serial No. 840,513.

*To all whom it may concern:*

Be it known that I, JOSEPH RUDNICKI, a citizen of the United States, residing at Buffalo, in the county of Erie and State of New York, have invented a certain new and useful Improvement in Vegetable-Cutters, of which the following is a specification.

My invention relates to vegetable cutters, and more particularly to vegetable cutters for cutting green vegetables, such as cabbage.

The object of my invention is to provide a simple and efficient apparatus which will cut or slice cabbage and similar vegetables rapidly and easily and which may be readily adjusted to cut or slice to any desired degree of fineness.

Other novel features of my invention will be evident from the following specification and from the drawings in which—

Figure 1 is a perspective view of my apparatus. Fig. 2 is a top plan view. Fig. 3 is a section on the line 3—3, Fig. 2. Fig. 4 is a section on the line 4—4, Fig. 1. Fig. 5 is a section on the line 5—5, Fig. 4.

Journaled in a frame 6 is a shaft 7, which has a hand-crank 8 upon one end and a belt-pulley 9 upon the other, so that the device may be operated either by hand or by power. Secured in rotation with the shaft 7 is a two-part hub, composed of the two members 10 and 11, which are secured together by bolts. Between and clamped by these two members 10 and 11 is a metal disk 12, which is provided with radial, quadrantal slots which extend from a circle slightly greater in diameter than the diameter of the hub member 11 to points just outside the bolts 13, these slots being very slightly wider than the knives 14. Bolted to the plate 12 are rims 15 and 16, which may be made of any desired material, either metal or wood. The inside diameter of the rim piece 15 is slightly in excess of the slot diameter in the plate 12 to form seats for the outer ends of the knives 14. The inside diameter of the rim piece 16 is sufficiently less than that of the rim piece 15 to receive the bolts 13 which engage the outer ends of the knives 14. The inner ends of the knives 14 are held by bolts 17 which pass through the hub member 10.

The knives 14 are made with a very slight curve from end to end—so slight that the same cannot be shown in a drawing—and are made of tempered spring-metal. With this construction, the blades or knives 14 tend to lie out of plane with the disk 12, but may be drawn down into plane with it by setting up the bolts 13 and 17 very tight. Thus the width of cut of the knives may be adjusted by means of these bolts 13 and 17.

Mounted rigidly upon the frame 6 is a feeding box 18, having a bottom and sides, and having secured to it the guide-rods 19, which serve to guide a feeding board 20, provided by a suitable handle 21.

To prevent wabbling or unsteady motion of the cutting member of the machine, I provided a plate 22 which is recessed slightly to take over the rim members 15 and 16, and which is adjustably secured to a cross-piece of the frame 6 by a bolt and wing-nut, as clearly shown in Fig. 2.

The operation of the machine is as follows: Power being applied to the shaft 7, either by hand or from any desired source of power, the disk and knives are set in rotation. A vegetable, such as a cabbage head shown in dotted outline at 23, is placed in the feeding box 18 and is shoved toward the knives by the feeding board 20. With the application of sufficient pressure to move the vegetable forward as it is sliced or cut, the cutting is completed, and the cut material falls into a receptacle 24 placed underneath the cutter. To prevent the scattering of the cut material by the centrifugal action of the cutter when run rapidly, I provide the shield 25, attached to the frame 6, and curved so as to cause the cut material thrown against it to fall into the receptacle 24. When one vegetable, or one fill of vegetables, is cut, the feeding board 20 is drawn outwardly, another supply of vegetables placed in the feeding box 18, and the operation is repeated.

Having thus described my invention, I claim:

1. A vegetable cutter including a disk formed with radial slots, a hub for rotatably supporting the disk, a rim secured to the peripheral edge of the disk, the rim and hub on one side of the disk being spaced apart a less radial distance than on the opposite side of the disk, and cutters secured to the disk and to the extended portions of the hub and rim.

2. A vegetable cutter including a disk, a two-part hub secured on opposite sides of the disk to rotatably support the latter, one part of the hub being of greater diametric extent, a two-part rim arranged on opposite sides of the disk adjacent the peripheral edge thereof, one part of the rim being of greater diametric length, the extended portions of the rim and hub projecting toward each other and being arranged on the same side of the disk, knives overlying the opposite side of the disk, and fastening means passed through the knife and through the extended portions of the hub and rim.

3. A vegetable cutter including a disk, a two-part hub secured on opposite sides of the disk to rotatably support the latter, one part of the hub being of greater diametric extent, a two-part rim arranged on opposite sides of the disk adjacent the peripheral edge thereof, one part of the rim being of greater diametric length, the extended portions of the rim and hub projecting toward each other and being arranged on the same side of the disk, said disk being formed with radial slots extending in both directions beyond the extended portions of the hub and rim, knives overlying the slots and fastening, an adjusting means connecting the knives and extended portions of the rim and hub.

4. A vegetable cutter including a disk, a two-part hub secured on opposite sides of the disk to rotatably support the latter, one part of the hub being of greater diametric extent, a two-part rim arranged on opposite sides of the disk adjacent the peripheral edge thereof, one part of the rim being of greater diametric length, the extended portions of the rim and hub projecting toward each other and being arranged on the same side of the disk, said disk being formed with radial slots, extending in both directions beyond the extended portions of the hub and rim, curved knives overlying the slots and fastening, an adjusting means connecting the knives and extended portions of the rim and hub.

JOSEPH RUDNICKI.

Witnesses:
RICHARD SOMMER,
D. H. HARPER.

Copies of this patent may be obtained for five cents each, by addressing the "Commissioner of Patents, Washington, D. C."